April 20, 1965
R. J. BECK
3,178,958
JACK MECHANISM
Filed March 6, 1964
2 Sheets-Sheet 1
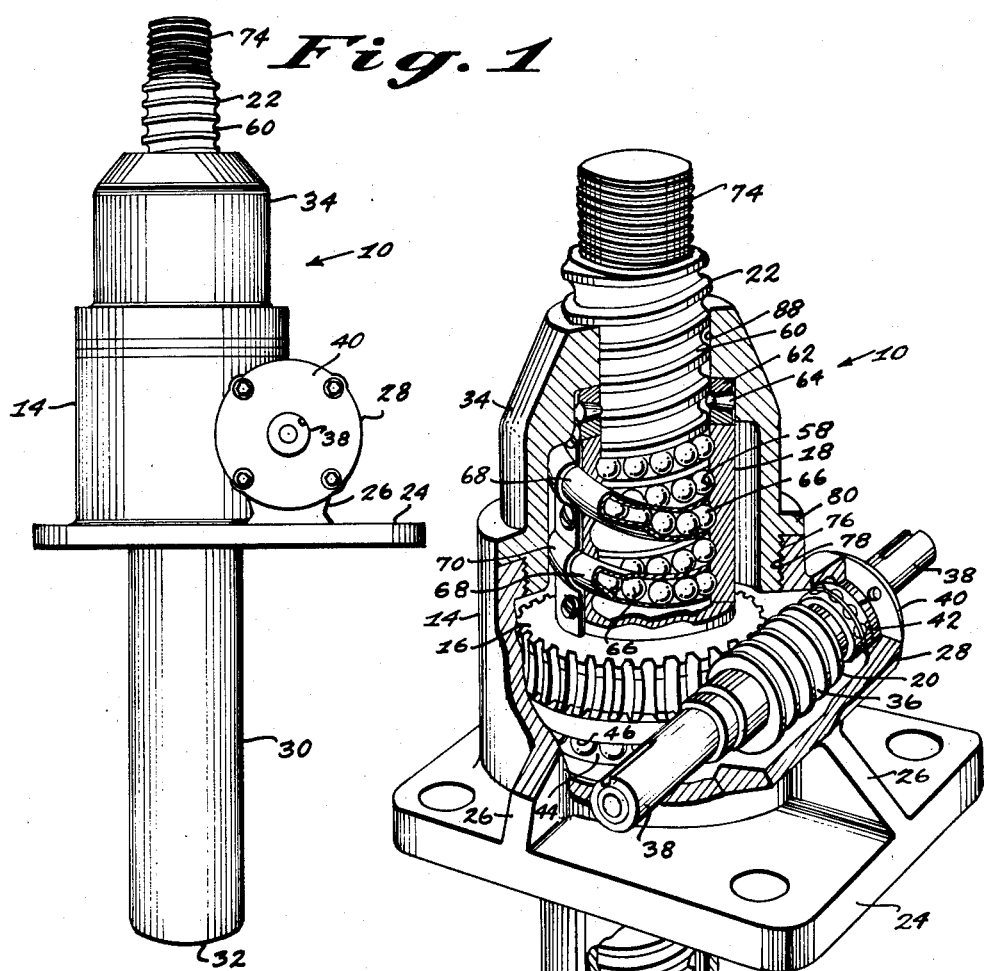
INVENTOR.
ROBERT J. BECK
BY
Channing P. Richards &
Dalbert U. Shefte
ATTORNEYS April 20, 1965 R. J. BECK 3,178,958
JACK MECHANISM Filed March 6, 1964 2 Sheets-Sheet 2

INVENTOR.
ROBERT J. BECK
BY
Channing P. Richards &
Dalbert U. Shefte
ATTORNEYS

United States Patent Office 3,178,958
Patented Apr. 20, 1965

3,178,958
JACK MECHANISM
Robert J. Beck, Charlotte, N.C., assignor to Duff-Norton Company, Charlotte, N.C., a corporation of North Carolina
Filed Mar. 6, 1964, Ser. No. 350,031
11 Claims. (Cl. 74—424.8)

The present invention is directed to a jack mechanism characterized by a long wear life and efficient, low friction, operation; and is particularly advantageous in heavy duty jack mechanisms, as a jack capable of handling loads weighing tons can be made accordingly to the present invention of comparatively small size and relatively low power requirements, and can be operated at high speeds over relatively long lengths of travel and for prolonged periods without significant heat build-up.

Briefly described, the jack mechanism of the present invention is composed of a load handling jack screw that is lineally actuated by rotation of an operating member or nut through movable bearing elements confined within mating threads of the screw and nut. In addition to threads, the operating member or nut has an interior, annular, screw guiding surface for guiding and stabilizing the jack screw in proper axial alignment, and is mounted for rotation in a support housing that has a cap portion extending beyond the operating member or nut with an annular screw guiding surface outwardly of the operating member and substantially spaced from the screw guiding surface of the operating member for further guiding and stabilizing the jack screw. Further, the housing and its cap portion present a substantial, outer, heat transfer surface for dissipation of heat sufficient to allow prolonged operation without significant heat build-up.

The aforementioned bearing elements provide low friction operation as compared with conventional meshing thread jack mechanisms, with the result that less power is wasted overcoming friction and, therefore, loads can be handled with less input power and smaller size units than heretofore required. This low friction resulting from the use of bearing elements also minimizes wear from axial loading to make possible a long wear life, but such bearing elements are particularly susceptible to wear from side loading as side loading is concentrated on only a few bearing elements and wear life is disproportionately reduced by any side loading. However, side loading is substantially minimized in the present invention by the spaced screw guides, one in the operating member and one in the housing cap portion, which stabilize the screw in proper axial alignment to resist side loading and relieve the bearing elements from the wearing effect thereof.

The reduction of friction, side loading and wear is especially significant in heavy duty jack mechanisms, in which the size and power requirements are of such magnitude as to be of particular concern and in which wear is accentuated by the heavy loads. With the present invention, power requirements are substantially minimized by the low friction resulting from the use of bearing elements, which also substantially reduces wear, with wear being further minimized by the relief of the effect of side loading on the bearing elements. This reduction in power and wear allows a significant reduction in unit size without reducing the load capacity.

Another problem of particular concern in heavy duty jack mechanisms is that of heat build-up during manipulation of heavy loads. This is primarily a result of friction and is significantly reduced by use of the low friction bearing elements and is further reduced with the present invention by providing a substantial heat dissipating surface on the housing and its cap portion such that heat developing during operation is spread over this heat dissipating surface and is readily transferred to the atmosphere thereby.

In the preferred embodiment of the present invention, the operating member is compositely formed of a gear component having an inner, screw guide, surface, and a nut component extending axially from the gear component, with the housing cap portion extending beyond the nut component and having a screw guide surface outwardly thereof and spaced by the extent of the nut component a substantial distance from the gear component screw guide surface to provide enhanced stabilization of the jack screw in proper axial alignment. The extent of the cap portion also provides a substantial heat dissipating surface sufficient to minimize heat build-up. In addition, the nut component has an inclined return conduit on its outer surface for circulation of the bearing elements and providing, during rotation of the nut component, a means for advantageously agitating lubricant confined within the unit by the enclosing housing and cap portion.

The above and other features and advantages of the present invention are illustrated and described in detail with reference to the preferred embodiment in the following description and accompanying drawings, in which:

FIG. 1 is an elevational view of a jack mechanism according to the preferred embodiment of the present invention;

FIG. 2 is an enlarged perspective view, partially in section, of the jack mechanism of FIG. 1;

Figure 3:
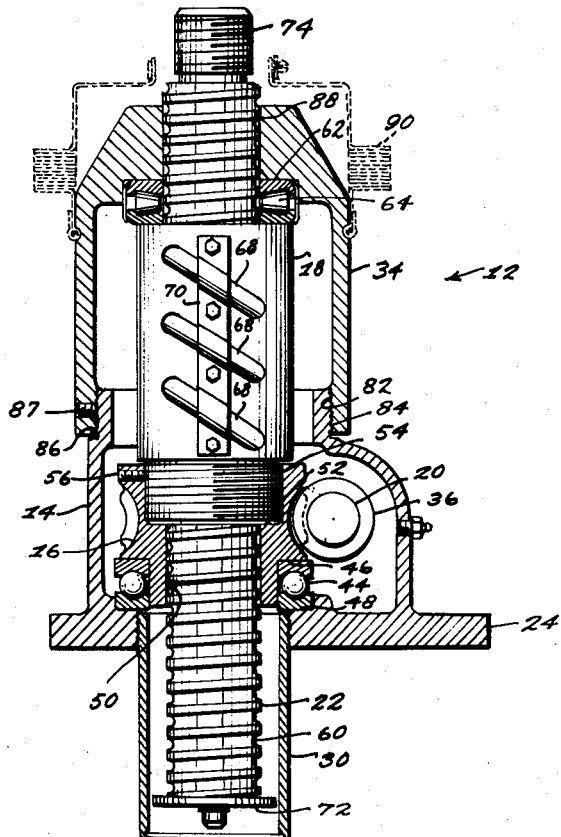
FIG. 3 is a vertical sectional view of a variation of the jack mechanism of FIG. 1.
Figure 4:
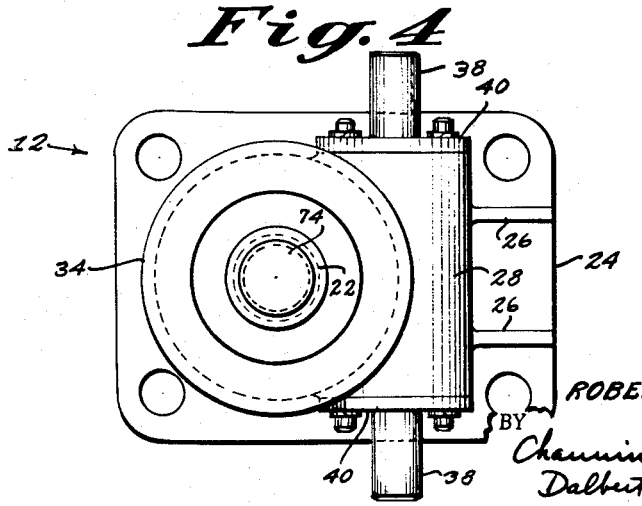
FIG. 4 is a plan view of the jack mechanism of FIG. 3.

The jack mechanism of the embodiment illustrated is in the form of a heavy duty worm gear jack capable of lifting loads weighing tons, for example, in the range of 2 to 250 tons. With a 1½ inch diameter jack screw and a 10¾ inch closed height, the jack 10 of FIGS. 1 and 2 has a 10-ton capacity; with a jack screw diameter of 3 inches and a closed height of 19¾ inches, the variation 12 of FIGS. 3 and 4 has a 25-ton capacity. As the variation of FIGS. 3 and 4 is substantially identical in structure to the embodiment of FIGS. 1 and 2, identical reference numerals are used in all figures to indicate corresponding elements, with variations indicated independently and described below.

This worm gear jack consists of a housing 14, in which is rotatably mounted a composite operating member composed of a worm gear 16 and a ball nut 18, with the worm gear 16 driven by a worm shaft 20 for rotation of the ball nut 18 that transmits rotation thereof into linear actuation of a jack screw 22 that extends through the housing 14, worm gear 16 and ball nut 18.

The housing 14 is cylindrically shaped about a vertical axis and has a horizontal base platform 24 for attachment of the jack to a convenient supporting structure (not shown). Reinforcing ribs 26 provide rigidity and strength for support of the housing on the base platform 24. The housing 14 has a transversely extending tubular section 28 offset from the vertical axis of the housing for support of the worm shaft 20, and has a depending coaxial sleeve 30 for containing the extending lower end of the jack screw 22, with the lower end 32 of the sleeve 30 being closed to protect the jack screw and the interior of the jack unit from dust and other foreign matter.

The housing 14 is further provided with a cylindrical cap portion 34 extending upwardly beyond the ball nut 18 to complete the enclosure of the operating elements within the housing.

The worm shaft 20 is mounted horizontally in the transverse tubular section 28 of the housing 14 and has a worm section 36 within the tubular section for drivingly meshing with the worm gear 16. The worm shaft 20 has keyed ends 38 extending from both ends of the tubular section 28 for attachment at either end of any suitable conventional drive means (not shown). These keyed ends 38 are mounted in bearing plates 40 at the ends of the transverse tubular section 28 with intermediate ball bearings 42 providing for substantially frictionless rotation of the worm shaft 20 with respect to the housing 14.

The worm gear 16 is horizontally disposed about the vertical axis within the housing 14 and has an exterior worm gear surface meshing with the worm section 36 of the worm shaft 20 for rotation of the worm gear upon rotation of the worm shaft. The worm gear 16 is supported on a ball bearing ring 44 seated in an annular recess 46 on the bottom of the worm gear and on an annular flange 48 of the housing platform 24. Further, the worm gear 16 has an inner, annular, screw guiding, surface 50 surrounding the jack screw 22 in guiding relation thereto for stabilizing the screw in proper axial alignment with respect to the worm gear and ball nut. This screw guiding surface 50 rotates with the worm gear 16, resulting in uniform wear by side loading as compared with a fixed guide surface on which wear from a particular side loading would be concentrated at a confined area. Above this guiding surface 50, the bore of the worm gear is shouldered, as at 52, and threaded thereabove for mounting of the ball nut 18. The shoulder 52 provides a seat of substantial bearing area for supporting adequately a ball nut 18 of minimum diameter as compared with a seating of the ball nut at the top face of the worm gear, which must have a sufficient inner diameter to accommodate insertion of the end of the ball nut 18 thereinto.

The ball nut 18 has an exteriorly threaded lower end 54 that is screwed into the threaded shoulder portion 52 of the worm gear 16 and retained therein by set screw 56 for fixed attachment to the worm gear for rotation therewith. The ball nut extends coaxially above the worm gear and has an interior, helical, ball confining, groove 60 on the surface of the jack screw 22.

The upper end of the ball nut 18 is supported in the housing cap portion 34 by a bearing either a ball thrust type or preferably an annular taper bearing 62 that has tapered roller bearing elements 64 that provide some resistance to transverse shifting of the jack screw 22 due to side loading, and the taper bearing 62 combines with the ball bearing ring 44 at the bottom of the worm gear 16 to retain the ball nut and worm gear in fixed vertical position in the housing 14, while permitting rotation thereof.

Rotation of the worm gear 16 and ball nut 18 is transformed into linear actuation of the jack screw 22 by ball bearing elemens 66 confined in the mating grooves 58 and 60 of the ball nut 18 and jack screw 22, respectively. These ball bearing elements 66 are movable in the grooves for rolling therealong and circulate through ball return passages 68, two of which are shown in the embodiment of FIG. 2 and three of which are shown in the variation of FIG. 3. These ball return passages 68 connect spaced portions of the ball nut groove 58 to allow the balls to circulate as the ball nut 18 rotates around the jack screw 22. In the embodiment illustrated, the ball return passages 68 are in the form of conduits attached to the exterior of the ball nut 18 and extending thereinto, and are attached to the outer surface of the ball nut by a bracket strip 70. These conduits are inclined on the exterior of the ball nut as they extend between spaced portions of the groove, and therefore serve as vanes during rotation of the ball nut for agitating lubricant contained in the housing exteriorly of the operating elements therein.

The jack screw 22 extends downwardly into the aforementioned protective sleeve 30 and has a stop plate 72 secured to its lower end for abutment against the bottom of the worm gear 16 to prevent unintentional unscrewing of the jack screw from the worm gear and ball nut.

The jack screw 22 extends upwardly from the housing cap portion 34 and has an upper threaded end 74 for attachment to a load or an intermediate element of convenient form for supporting or attachment to the load. The threads also serve to lock the jack screw 22 against rotation by serving as a torque restraint to prevent nonoperating rotation of the jack screw during rotation of the worm gear 16 and ball nut 18. Prevention of rotation could also be obtained by keying the jack screw to the housing 14 or sleeve 30, or by any other convenient means.

The cap portion 34 of the housing 14 is shown in FIG. 2 with an exterior thread 76 mating with an interior thread 78 of the housing 14 and having an exterior annular flange 80 that faces the top of the housing 14 when the cap portion 34 is screwed onto the housing 14, with the flange 80 locked with respect to the housing top by set screws (not shown).

In the variation of FIG. 3, the cap portion 34 has an interior thread 82 that meshes with an exterior thread 84 at the top of the housing 14 with the bottom of the cap portion 34 facing a shoulder 86 on the housing 14 below the exterior thread 84 and locked by set screw 87.

In both the embodiment of FIGS. 1 and 2 and the variation of FIGS. 3 and 4, the cap portion 34 extends upwardly beyond the ball nut 18, which is enclosed thereby, and is formed with an inner, annular, screw guiding surface 88 beyond the ball nut 18 and spaced substantially from the screw guiding surface 50 of the worm gear 16 by the vertical extent of the ball nut 18. These spaced screw guiding surfaces combine to provide firm stabilization of the jack screw in proper axial alignment with respect to the ball nut 18 so that substantially all side loading of the jack screw will be resisted by the guiding surfaces such as to prevent little or no side loading effect on the ball bearing elements 66, which are particularly susceptible to wear by side loading as the effect of side loading is concentrated on only a few elements.

The housing 14 and its cap portion 34 completely enclose the operating elements of the worm gear jack to provide a unitary structure and protection for the enclosed elements. Further, the substantial extent of the housing 14 and its cap portion 34, and particularly the elongated extent of the cap portion 34 over the ball nut 18 provides a significant exterior surface for efficient heat transfer to the atmosphere of heat developed during operation, which heat is readily dissipated by this exterior surface. Heat build-up is particularly a problem in heavy duty jacks due to the extreme loads handled by these jacks. Thus, the heat dissipation feature of the present invention not only allows operation at higher speeds, but also for prolonged periods and long lengths of travel.

If desired, as shown in FIG. 3, a conventional, collapsible, dust shield 90 may be mounted at the top of the cap portion 34 with its upper end attached to the upper end of the jack screw 22 for movement therewith to protect the exposed jack screw groove from dust and other damaging effects.

A worm gear jack made according to the above-described preferred embodiment of the present invention has a motion-efficiency up to 75 percent depending on the ratio of the worm gear set, as compared to only about 25 percent for a conventional jack screw. Thus, the jack requires only about ⅓ the power input of a conventional jack and need be only about ⅓ the size of a conventional jack to accomplish the same work. This improved motion-efficiency also reduces the heat build-up as only about 15 to 25 percent of the power is wasted as heat as compared to about 75 percent in a conventional jack. Thus the smaller jack will not develop undesirable heat build-up, and the enhanced heat dissipation area provided by the present invention further reduces the heat build-up potential such that the small size jack with low power input can be used to lift extremely heavy loads for prolonged periods and over comparatively long lengths of travel. Depending upon the size of the jack, a jack made according to the present invention may be operated continuously, and even in a jack used for lifting extremely heavy tonnage, a travel of 20 feet may be readily accomplished without stopping, whereas a comparable capacity conventional jack must normally be stopped after a run of about 36 inches because of the heat build-up. For similar reasons, jacks made according to the present invention may be run at substantially higher speeds than conventional jacks. Thus, a heavy duty jack according to the present invention may be run at speeds of the order of 30 feet per minute.

Another important aspect of the present invention is the long wear life obtained due to the use of bearing elements and the protection of the bearing elements by the screw guiding surfaces of the worm gear and housing cap portion. Jacks made according to the present invention for lifting loads in the range of 2 to 250 tons have minimum life expectancies of from 30,000 to 420,000 inches of travel at full load and about 1,000 times this rating at 10 percent of full load, depending upon the particular type and capacity of jack.

It should be understood that the present invention has been described in detail above for the purpose of illustration only, and is not intended to be limited thereby or otherwise except as defined in the appended claims.

I claim:

1. A jack mechanism comprising a support housing, a composite operating member mounted for rotation in said housing and retained in a fixed disposition therein, a jack screw extending through said housing and operating member for axial lineal movement and having an exterior, helical, groove, said composite operating member having a nut component with an interior, helical, groove mating with said jack screw groove and a return passage connecting spaced portions of said interior groove, a plurality of bearing elements confined in said grooves and passage and movable therein for drivingly connecting said nut component and said jack screw, said composite operating member having a gear component with an interior, annular, screw guiding surface for guiding and stabilizing said jack screw in proper axial alignment with respect to said nut component, and gear means drivingly engaging said gear component to rotate said operating member to effect lineal actuation of said jack screw.

2. A worm gear jack comprising a support housing, a worm gear mounted for rotation in said housing and retained in a fixed disposition, a jack screw extending through said housing and worm gear for axial lineal movement and having an exterior, helical, groove, a nut mounted on said worm gear for rotation therewith and having an interior, helical, groove mating with said jack screw groove and a return passage connecting spaced portions of said interior groove, a plurality of bearing elements confined in said grooves and passage and movable therein for drivingly connecting said nut and said jack screw, said worm gear having an interior, annular, screw guiding surface for guiding and stabilizing said jack screw in proper axial alignment with respect to said nut, and a rotatable worm engaging said worm gear to rotate said worm gear and nut to effect lineal actuation of said jack screw.

3. A jack mechanism comprising a support housing, a composite operating member mounted for rotation in said housing, a jack screw extending through said housing and operating member for axial lineal movement and having an exterior, helical, groove, said composite operating member having a gear component and a nut component mounted on said gear component for rotation therewith and extending therefrom axially of said jack screw, said nut component having an interior, helical, groove mating with said jack screw groove and a return passage connecting spaced portions of said interior groove, a plurality of bearing elements confined in said grooves and passage and movable therein for drivingly connecting said nut component and said jack screw, said housing having a cap portion extending beyond said nut component with an annular screw guiding surface disposed outwardly of said nut component and spaced from said gear component for guiding and stabilizing said jack screw in proper axial alignment with respect to said housing, and gear means drivingly engaging said gear component to rotate said operating member to effect lineal actuation of said jack screw.

4. A jack mechanism according to claim 3 and characterized further by an annular taper bearing unit interposed between said housing cap portion and the outer end of said nut component, said bearing unit having a radially inward taper to maintain said nut component in axial alignment with respect to said housing.

5. A jack mechanism according to claim 3 and characterized further in that said return passage extends through an inclined conduit mounted exteriorly on said nut component, with said inclined conduit serving as an agitator for lubricant contained within said housing.

6. A jack mechanism comprising a support housing, a composite operating member mounted for rotation in said housing, a jack screw extending through said housing and operating member for axial lineal movement and having an exterior, helical, groove, said composite operating member having a gear component and a nut component mounted on said gear component for rotation therewith and extending therefrom axially of said jack screw, said nut component having an interior, helical, groove mating with said jack screw groove and a return passage connecting spaced portions of said interior groove, a plurality of bearing elements confined in said grooves and passage and movable therein for drivingly connecting said nut component and said jack screw, said gear component having an interior, annular, screw guiding surface, said housing having a cap portion extending beyond said nut component with an annular screw guiding surface disposed outwardly of said nut component and spaced from said gear component screw guiding surface to position said nut component between said guiding surfaces, said spaced screw guiding surfaces guiding and stabilizing said jack screw in proper axial alignment with respect to said nut component and housing, and gear means drivingly engaging said gear component to rotate said operating member to effect lineal actuation of said jack screw.

7. A jack mechanism according to claim 6 and characterized further by an annular taper bearing unit interposed between said housing cap portion and the outer end of said nut component, said bearing unit having a radially inward taper to maintain said nut component in axial alignment with respect to said housing.

8. A heavy duty jack mechanism capable of high speed, prolonged, operation, comprising a support housing, a composite operating member mounted for rotation in said housing, a jack screw extending through said housing and operating member for axial lineal movement and having an exterior, helical, groove, said composite operating member having a gear component and an elongated nut component mounted on said gear component for rotation therewith and extending therefrom axially of said jack screw, said elongated nut component having an interior, helical, groove mating with said jack screw groove and a return passage connecting spaced portions of said interior groove, said return passage extending through an inclined conduit mounted exteriorly on said nut component with said inclined conduit serving as an agitator for lubricant contained within said housing, a plurality of bearing elements confined in said grooves and passage and movable therein for drivingly connecting said nut component and said jack screw, said housing having an elongated cap portion extending over said elongated nut component and closely adjacent thereto with a substantial, outer, heat transfer, surface for dissipation of heat developing during heavy duty, high speed, operation, and gear means drivingly engaging said gear component to rotate said operating member to effect lineal actuation of said jack screw.

9. A heavy duty worm gear jack capable of high speed, prolonged, operation, comprising a support housing, a worm gear mounted for rotation in said housing, a jack screw extending through said housing and worm gear for axial lineal movement and having an exterior, helical groove, an elongated nut mounted on said worm gear for rotation therewith and having an interior, helical, groove mating with said jack screw groove and a return passage connecting spaced portions of said interior groove, a plurality of bearing elements confined in said grooves and passage for drivingly connecting said nut and said jack screw, said worm gear having an interior, annular, screw guiding surface, said housing having an elongated cap portion extending over said elongated nut and closely adjacent thereto with a substantial outer, heat transfer, surface for dissipation of heat developing during heavy duty, high speed operation, said elongated cap portion extending axially beyond said nut and having an annular screw guiding surface outwardly of said nut and spaced thereby from said worm gear screw guiding surface, said spaced screw guiding surfaces guiding and stabilizing said jack screw in proper axial alignment with respect to said nut and housing, and a rotatable worm engaging said worm gear to rotate said worm gear and nut to effect lineal actuation of said jack screw.

10. A jack mechanism according to claim 3 and characterized further by an annular bearing unit interposed between said housing cap portion and the outer end of said nut component and retained by said housing cap portion in retaining engagement with said nut component to retain said composite operating member in proper disposition and to transmit a load from said operating member to said housing.

11. A jack mechanism according to claim 10 and characterized further by an annular bearing unit interposed between said housing cap portion and the outer end of said nut component, and another annular bearing unit interposed between said gear component and said housing, said bearing units retaining said operating member in proper disposition and transmitting loads in either axial direction from the operating member to said housing.

References Cited by the Examiner
UNITED STATES PATENTS

| | | | |
|---|---|---|---|
| 1,470,180 | 10/23 | Miller | 254—98 X |
| 2,227,111 | 12/40 | Sturm | 254—98 |
| 3,135,497 | 6/64 | Beck | 74—424.8 |

DON A. WAITE, *Primary Examiner.*